United States Patent
Yamaguchi et al.

(10) Patent No.: US 6,930,969 B2
(45) Date of Patent: Aug. 16, 2005

(54) OPTICAL RECORDING MEDIUM APPLICABLE FOR IMPROVED SERVO CONTROL

(75) Inventors: Atsushi Yamaguchi, Saitama (JP); Masahiro Kato, Saitama (JP); Eiji Muramatsu, Saitama (JP)

(73) Assignee: Pioneer Corporation, Tokyo (JP)

( * ) Notice: Subject to any disclaimer, the term of this patent is extended or adjusted under 35 U.S.C. 154(b) by 656 days.

(21) Appl. No.: 09/983,732

(22) Filed: Oct. 25, 2001

(65) Prior Publication Data

US 2002/0048246 A1 Apr. 25, 2002

(30) Foreign Application Priority Data

Oct. 26, 2000 (JP) ..................................... P2000-327497

(51) Int. Cl.[7] ................................................. G11B 7/24
(52) U.S. Cl. ................................ 369/59.23; 369/275.3; 369/275.4
(58) Field of Search ........................... 369/59.25, 275.3, 369/275.4

(56) References Cited

U.S. PATENT DOCUMENTS 6,633,534 B1 * 10/2003 Tosaki et al. ............ 369/275.3
6,721,265 B1 * 4/2004 Fujii et al. ............... 369/275.4
6,771,579 B2 * 8/2004 Suzuki .................... 369/59.12

FOREIGN PATENT DOCUMENTS

| EP | 0 867 869 A2 | 9/1998 |
| EP | 1 001 410 A2 | 5/2000 |
| EP | 1 054 399 A1 | 11/2000 |
| EP | 1 065 659 A2 | 1/2001 |
| EP | 1 102 248 A1 | 5/2001 |
| EP | 1 126 446 A2 | 8/2001 |
| EP | 1 176 587 A2 | 1/2002 |
| WO | WO 00/07182 | 2/2000 |

* cited by examiner

Primary Examiner—Gautam R. Patel
(74) Attorney, Agent, or Firm—Morgan, Lewis & Bockius LLP

(57) ABSTRACT

In an optical recording medium 10 comprising groove tracks 11 including a first area Ba for recording record information and a second area Ca in which predetermined data is formed as embossed pit rows 19 and a readout of other data overwritten and recorded on said embossed pit rows 19 is prevented, and land tracks 12 formed between the adjacent groove tracks 11, a depth Ed and a duty of the embossed pit rows 19 are set so that a radial push-pull signal in the first area and a radial push-pull signal in the second area become the substantially same level.

3 Claims, 12 Drawing Sheets

OPTICAL RECORDING MEDIUM APPLICABLE FOR IMPROVED SERVO CONTROL

BACKGROUND OF THE INVENTION

1. Field of the Invention

The present invention relates to an optical recording medium capable of optically recording record information, an optical recording medium manufacturing apparatus for forming such an optical recording medium and an optical recording medium manufacturing method for forming such an optical recording medium.

2. Description of the Related Art

At present, a reproduction-only DVD-Video disk on which contents are previously recorded and a DVD-RW (DVD Re-recordable) disk as an optical recording medium capable of optically recording record information have been known. FIG. 13 shows a main enlarged view of such a DVD-RW disk and specifically shows an enlarged view of a boundary portion between a buffer zone (area of a direction of an arrow Ba in the drawing) within a read-in area and a control data zone placed in the just front thereof (area of a direction of an arrow Ca in the drawing). Incidentally, for the purpose of making a disk structure easy to understand, in FIG. 13, upper and lower surfaces of the disk are depicted in reverse.

As shown in FIG. 13, according to the DVD-RW disk, in a first area such as the buffer zone or data area in which record information is recorded, groove tracks 1 having a depth Gd [nm] for recording the record information are meanderingly formed and land pre-pits 3 for generating various information such as an address are formed on land tracks 2 located between the adjacent groove tracks 1. Also, according to the DVD-RW disk, in order to prevent an illegal copy of the DVD-Video disk by means of bit by bit, control information recorded thereon is formed into embossed pit rows 4 having the same depth Gd [nm] as that of the groove tracks 1 to be recorded in the control data zone and the groove tracks become an intermittent state.

According to the DVD-RW disk as described above, since the embossed pit rows 4 are embedded in the control data zone, in case that the illegal copy of the DVD-Video disk is made by means of bit by bit, readout of data overwritten in the control data zone is prevented by a reproduction output through the embossed pit rows 4 to disable the illegal copy. However, in the DVD-RW disk constructed thus, the embossed pit rows 4 are formed, so that a radial push-pull signal level in the control data zone (a second area) decreases with respect to a radial push-pull signal level in other first area in which the record information is recorded and a problem of causing instability of operation of a tracking servo circuit or a spindle servo circuit in a recording and reproducing apparatus has arisen.

SUMMARY OF THE INVENTION

The invention is implemented in view of the problem, and an object of the invention is to provide an optical recording medium capable of obtaining a constant radial push-pull signal over the whole region of a disk and stably maintaining an operation of a servo circuit in a recording and reproducing apparatus, an optical recording medium manufacturing apparatus and an optical recording medium manufacturing method for forming such an optical recording medium.

In order to solve the problem, according to a first aspect of the invention, there is provided an optical recording medium capable of optically recording record information, comprising:

a first region formed continuous groove tracks thereon to be recorded the record information; and a second region formed discontinuous embossed pit rows thereon in accordance with predetermined data, wherein the embossed pre-pits rows prevents from reproducing data overwritten on the second region; and a level of a radial push-pull signal of the second region is not smaller than about 80% of a level of a radial push-pull signal of the first region.

According to a second aspect of the invention, there is provided the optical recording medium according to the first aspect of the invention, wherein the groove tracks and the embossed pit rows substantially satisfy the following mathematical equation $$\text{Duty}=0.04(Ed-\lambda/8n)^2+(-0.07Gd^2+6Gd-35.6)$$

where Duty [%] is an average duty of the embossed pit rows, Ed [nm] is a depth of the embossed pit rows, λ [nm] is a wavelength of a light beam, and n is a refractive index of a substrate of the optical recording medium, and Gd [nm] is a depth of the groove track.

According to a third aspect of the invention, there is provided an optical disk master manufacturing apparatus for manufacturing an optical disk master for manufacturing an optical recording medium capable of optically recording record information, the optical recording medium comprising a first region formed continuous groove tracks thereon to be recorded the record information and a second region formed discontinuous embossed pit rows thereon in accordance with predetermined data, wherein the embossed pre-pits rows prevents from reproducing data overwritten on the second region and a level of a radial push-pull signal of the second region is not smaller than about 80% of a level of a radial push-pull signal of the first region, the apparatus comprising:

a light beam generator for forming a plurality of regions on the optical disk master corresponding to the first and second regions of the optical recording medium; and a controller for controlling the light beam generator.

According to a fourth aspect of the invention, there is provided the optical disk master manufacturing apparatus according to the third aspect of the invention, wherein the groove tracks and the embossed pit rows of the optical recording medium substantially satisfy the following mathematical equation $$\text{Duty}=0.04(Ed-\lambda/8n)^2+(-0.07Gd^2+6Gd-35.6)$$

where Duty [%] is an average duty of the embossed pit rows, Ed [nm] is a depth of the embossed pit rows, λ [nm] is a wavelength of a light beam, and n is a refractive index of a substrate of the optical recording medium, and Gd [nm] is a depth of the groove track.

According to a fifth aspect of the invention, there is provided an optical disk master manufacturing method for manufacturing an optical disk master for manufacturing an optical disk master for manufacturing an optical recording medium capable of optically recording record information, the optical recording medium comprising a first region formed continuous groove tracks thereon to be recorded the record information and a second region formed discontinuous embossed pit rows thereon in accordance with predetermined data, wherein the embossed pre-pits rows prevents from reproducing data overwritten on the second region and a level of a radial push-pull signal of the second region is not smaller than about 80% of a level of a radial push-pull signal of the first region, the method comprising the steps of forming a plurality of regions on the optical disk master corresponding to the first and second regions of the optical recording medium.

According to a sixth aspect of the invention, there is provided the optical disk master manufacturing method according to the fifth aspect of the invention, wherein the groove tracks and the embossed pit rows of the optical recording medium substantially satisfy the following mathematical equation $$\text{Duty}=0.04(Ed-\lambda/8n)^2+(-0.07Gd^2+6Gd-35.6)$$

where Duty [%] is an average duty of the embossed pit rows, Ed [nm] is a depth of the embossed pit rows, λ [nm] is a wavelength of a light beam, and n is a refractive index of a substrate of the optical recording medium, and Gd [nm] is a depth of the groove track.

DETAILED DESCRIPTION OF THE PREFERRED EMBODIMENTS

A preferred embodiment of the invention will be described with reference to the drawings. Incidentally, an embodiment in case of applying the invention to a DVD-RW disk (hereinafter, abbreviated as DVD-RW) which is one of optical recording media capable of optically recording record information will be described.

First, a record format of the DVD-RW will be described with reference to FIGS. 1 to 3. Incidentally, FIG. 1 is a diagram showing a physical record area on the DVD-RW after video information is recorded according to the DVD-RW format.

Figure 1:
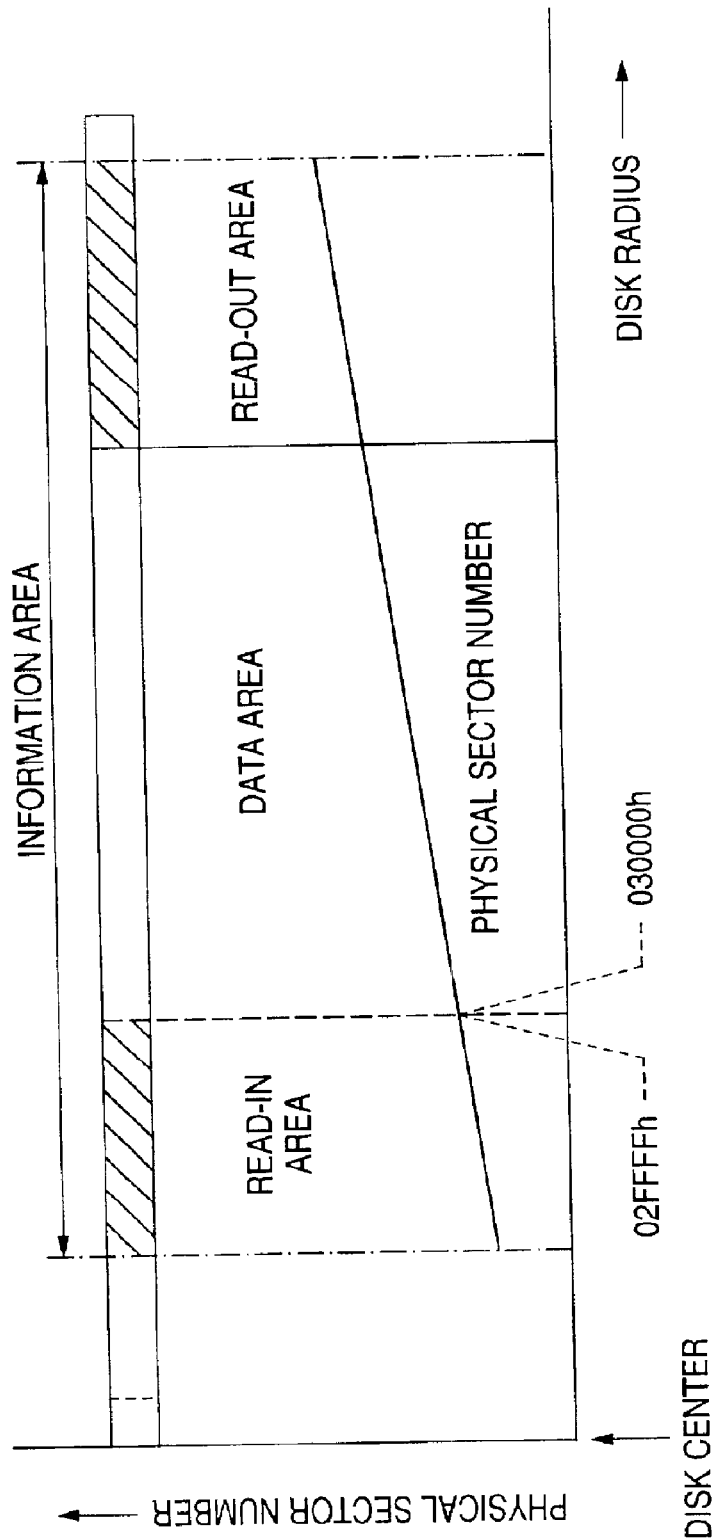
FIG. 1 is a diagram showing a structure of an information record surface of a DVD-RW disk.

As shown in FIG. 1, in an information area of the DVD-RW, a read-in area, a data area and a read-out area are sequentially recorded from a start point of the information area (a start point of a physical sector) toward the outside in a radial direction. The read-in area is an area first accessed at the time of recording and reproducing the DVD-RW, and physical information about such a DVD-RW, for example, a disk size, a minimum readout rate or a disk structure is recorded. The data area is an area in which contents, namely record information is mainly recorded. For example, as the contents to be recorded, there are image data, voice data, data capable of being read by a computer, programs, or the like. The read-out area is an area following the data area, and data [00h] indicating the record end is recorded for a predetermined period.

Figure 2:
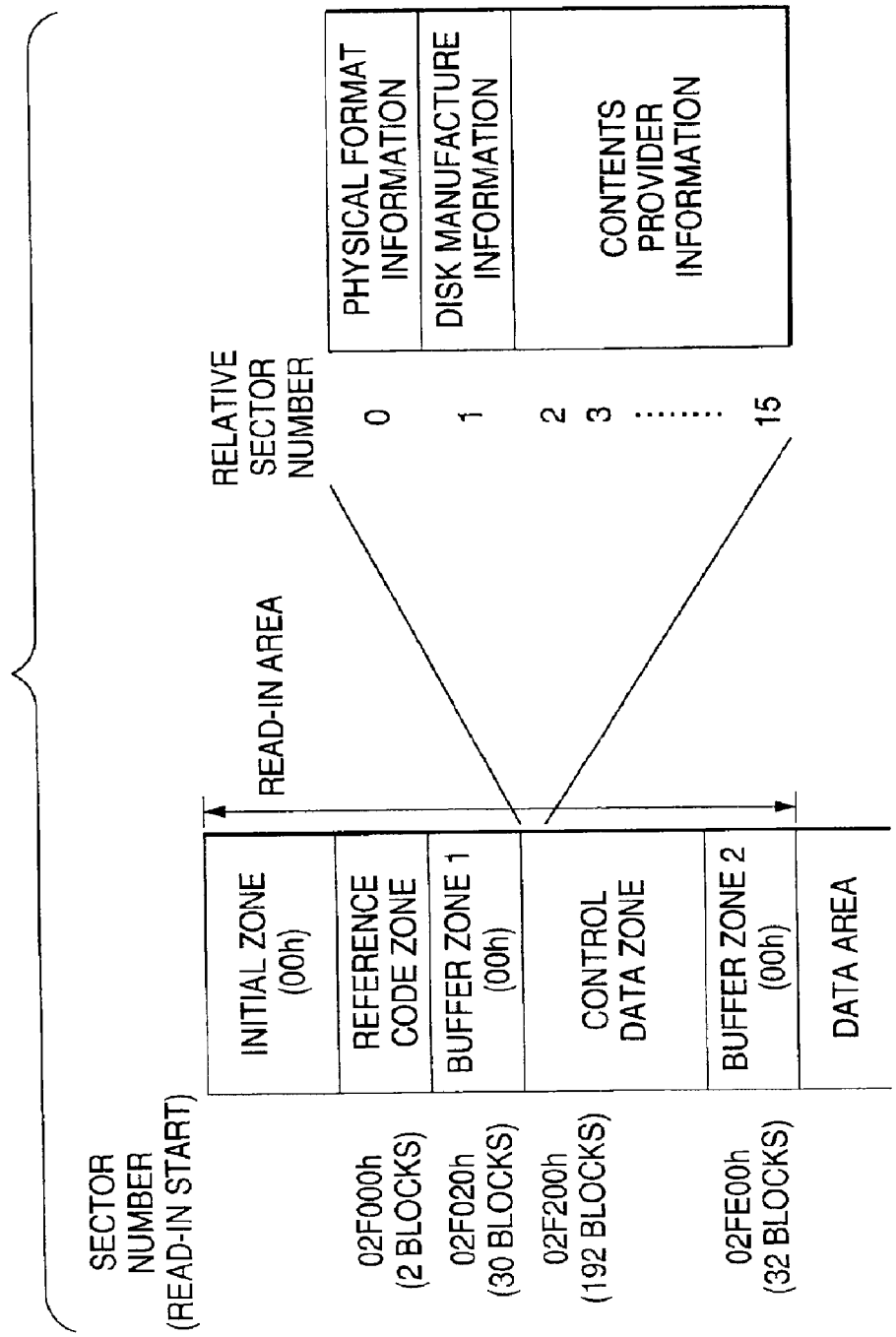
FIG. 2 is a diagram showing a structure of a read-in area of the DVD-RW disk.

FIG. 2 is a diagram showing a structure in the read-in area. The read-in area has an initial zone in which the data [00h] is recorded, a reference code zone in which data for generating a particular channel bit pattern (3T-6T-7T) is recorded, a buffer zone 1 in which data [00h] is recorded, a control data zone in which various control information is recorded, and a buffer zone 2 for leading to a data area in which data [00h] is recorded.

Such a control data zone is located at the same address as that of the control data zone in the DVD-Video disk as described above and control information previously recorded in this zone is formed into embossed pit rows to be embedded. Therefore, in this zone, in case that other data is overwritten and recorded, readout of the data is prevented by a reproduction output through the embossed pit rows.

Next, a record format of pre-information previously recorded on the DVD-RW will be described with reference to FIG. 3. Incidentally, in FIG. 3, the upper stage shows a record format in record information, and a waveform of the lower stage shows a wobbling waveform indicating a wobbling state (a plan view of groove tracks) of groove tracks 11 for recording the record information. Also, in FIG. 3, upward arrows between the record information and the wobbling waveform schematically show positions in which pre-pits are formed. Also, the wobbling waveform shown in FIG. 3 is illustrated to be an amplitude thereof greater than an actual amplitude in order to facilitate understanding.

Figure 3:
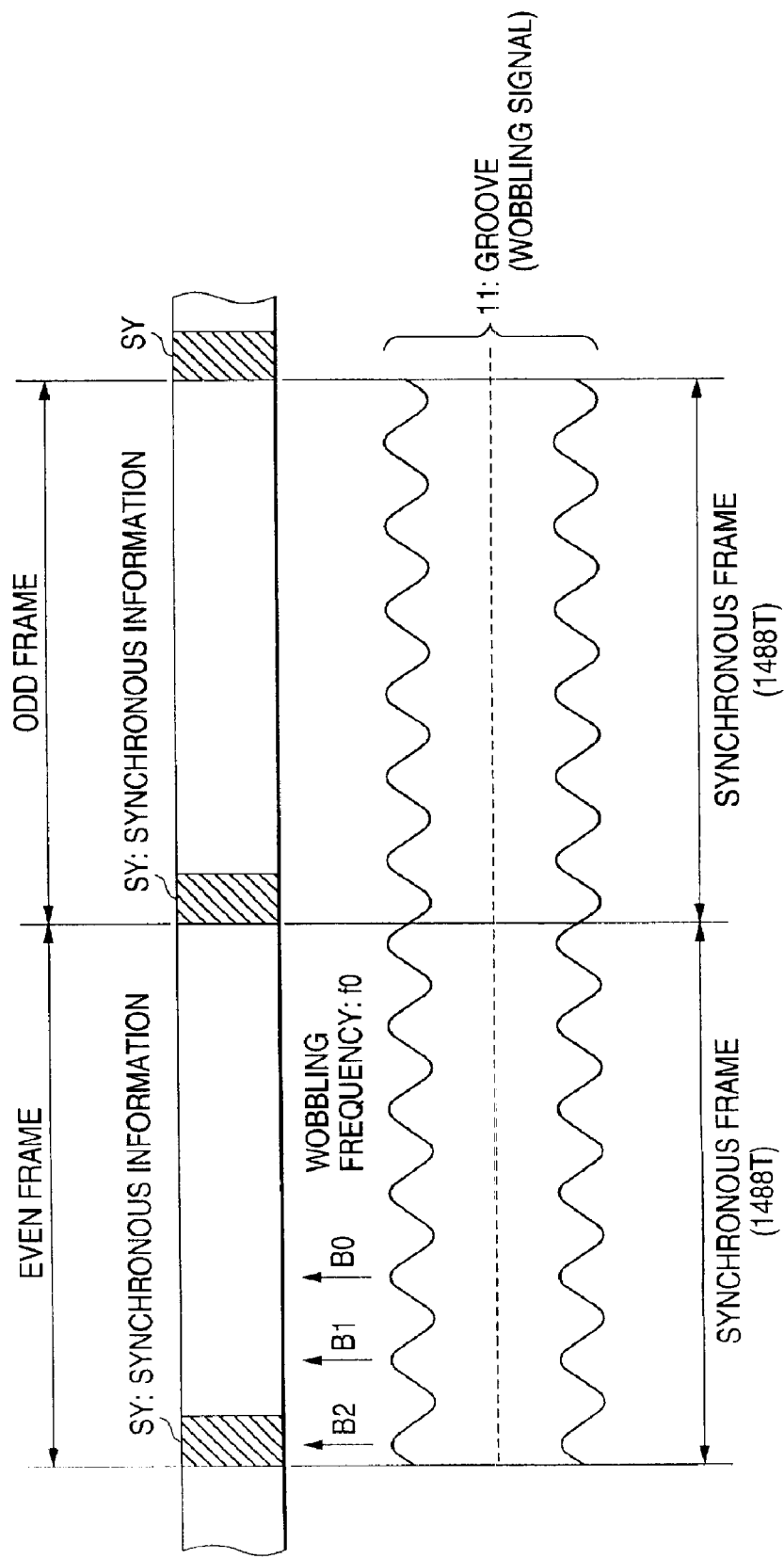
FIG. 3 is a diagram showing a record format of pre-information previously recorded on the DVD-RW disk.

The record information recorded on the DVD-RW is divided into every synchronous frame acting as information unit previously as shown in FIG. 3. One synchronous frame is constructed to have a length to be 1488 times (1488T) as large as a channel bit length (hereinafter called T) defined by a record format in case of recording the record information, and a front portion having 32T in length of one synchronous frame is used as synchronous information SY for synchronization every synchronous frame.

The pre-information recorded on the DVD-RW is recorded every synchronous frame. When the pre-information is recorded on the DVD-RW, one pre-pit B2 acting as indicator of a synchronous signal in the pre-information is always formed on a land track adjacent to an area in which the synchronous information SY of the synchronous frame is recorded, and two or one pre-pits (B1, B0) acting as indicator of the contents of the pre-information to be recorded are formed on a land track adjacent to a first half portion in the synchronous frame other than the synchronous information SY.

Normally, the pre-information is recorded by forming the pre-pits in even-numbered synchronous frames (hereinafter called "EVEN frame"). That is, in FIG. 3, the pre-pits (showed by upward arrows of solid lines in FIG. 3) are formed in the EVEN frame and the pre-pits are not formed in an ODD frame adjacent to the EVEN frame. More specifically, when the pre-pits are formed in the EVEN frame, in the synchronous frame of the head of a recording sector, all the pre-pits (pre-pits B2, B1 and B0) are formed, and in the synchronous frame other than the head of the recording sector, the pre-pits B2 and B0 are formed when the pre-information to be recorded in the synchronous frame is "1" and only the pre-pit B2 is formed when the information to be recorded is "0".

On the other hand, when the pre-pits are formed in odd-numbered synchronous frames (hereinafter called "ODD frame"), in the synchronous frame of the head of a recording sector, the pre-pits B2 and B1 are formed, and in the synchronous frame other than the head of the recording sector, the pre-pits are formed in a manner similar to the case of the EVEN frame.

It is determined which synchronous frames of the EVEN frames/ODD frames the pre-pits are formed depending on positions of the pre-pits formed previously on the adjacent land track. That is, the pre-pits are generally formed in the EVEN frames, but in case of forming the pre-pits in the EVEN frames, when the pre-pits are close to the pre-pits on the adjacent land track formed previously in a radial direction of a disk, the pre-pits are formed in the ODD frames. By forming the pre-pits thus, the pre-pits are absent in a position of the adjacent land track, so that an influence due to crosstalk can be avoided in case of detecting the pre-pits.

On the other hand, the groove tracks are wobbled at a constant wobbling frequency f0 (frequency holding eight waves of wobble signals in one synchronous frame) of 140 kHz over all the synchronous frames. By extracting this constant wobbling frequency f0, a recording and reproducing apparatus detects a signal for rotation control of a spindle motor or generates a clock signal for recording.

Figure 4:
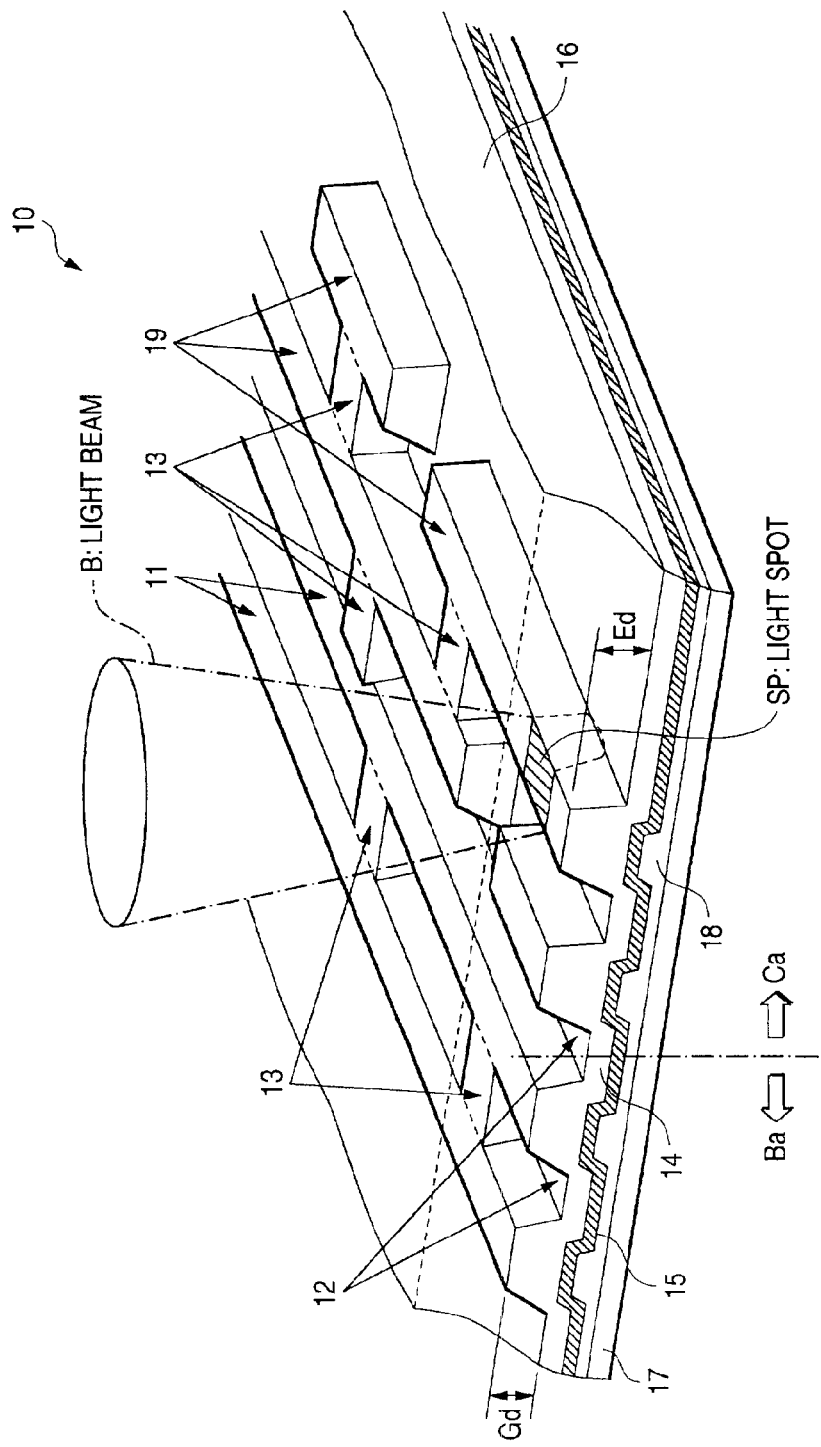
FIG. 4 is a diagram showing a structure of a record surface of a DVD-RW according to an embodiment.

Next, a structure of a record surface of a DVD-RW 10 according to the embodiment of the invention will be described with reference to FIG. 4. FIG. 4 shows a boundary portion between a buffer zone (Ba) in the read-in area and a control data zone (Ca) placed in just front of this buffer zone in a manner similar to FIG. 13 described above.

The DVD-RW 10 comprises a multi layer 14 formed of a record layer made of a phase change material (for example, GeSbTe) acting as a data record layer and a protective layer of a glass material (ZnS—SiO2) sandwiching this record layer, and constructs a phase change type optical recording medium. A reflection layer 15 for reflecting a light beam (B) at the time of data reproduction is formed below the multi layer 14 and further below the reflection layer, a transparent substrate (polycarbonate) 17 is bonded by an adhesive layer 18. Also, a transparent film (polycarbonate) 16 for protecting the multi layer 14 is provided in an incident surface side of the light beam (B).

Figure 13:
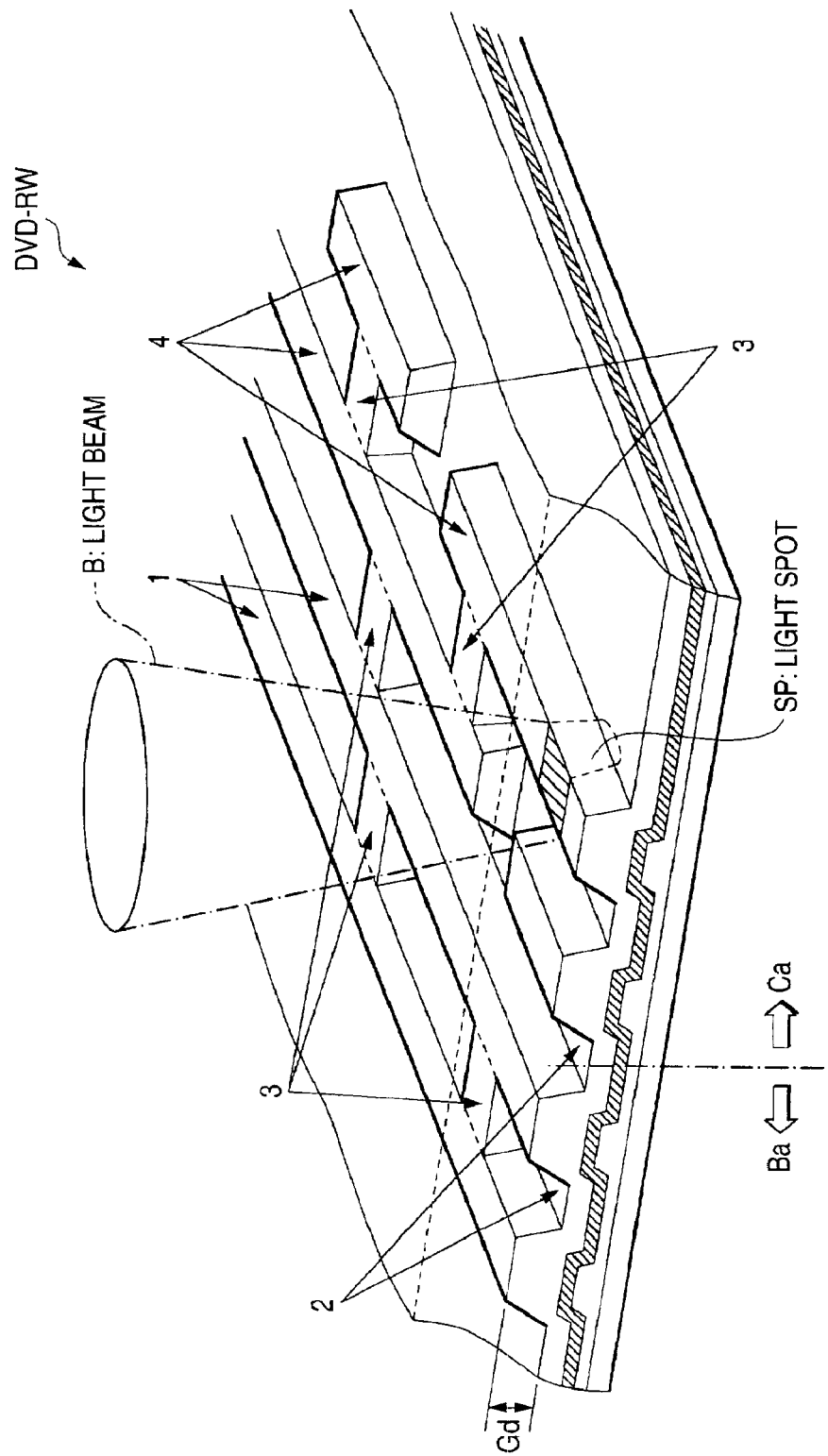
FIG. 13 is a diagram showing a structure of a record surface of a DVD-RW disk according to a related art.

As shown in FIG. 4, in an area (first area) such as a buffer zone other than control data, in a manner similar to the DVD-RW disk according to the related art shown in FIG. 13, the DVD-RW 10 is formed groove tracks 11 having a depth Gd of about 30 [nm] as an information record track, land tracks 12 between the adjacent groove tracks 11, and land pre-pits 13 having the same depth as that of the groove tracks 11 are formed on the land tracks 12.

Also, the DVD-RW 10 is formed embossed pit rows 19 having the average duty of 80%, land tracks 12, and land pre-pits 13 in the control data zone (second area) in a manner similar to the DVD-RW disk according to the related art. However, according to the DVD-RW 10 of the embodiment, the embossed pit rows 19 are formed at a depth Ed (50 nm) deeper than the depth Gd (30 nm) of the groove tracks 11.

This is performed in order to match a radial push-pull signal level in the control data zone, namely the second area with a radial push-pull signal level in the first area for recording other record information, and various conditions of the embossed pit rows 19 for matching the levels of the radial push-pull signals will be described below in detail with reference to FIGS. 5 and 6.

Figure 5:
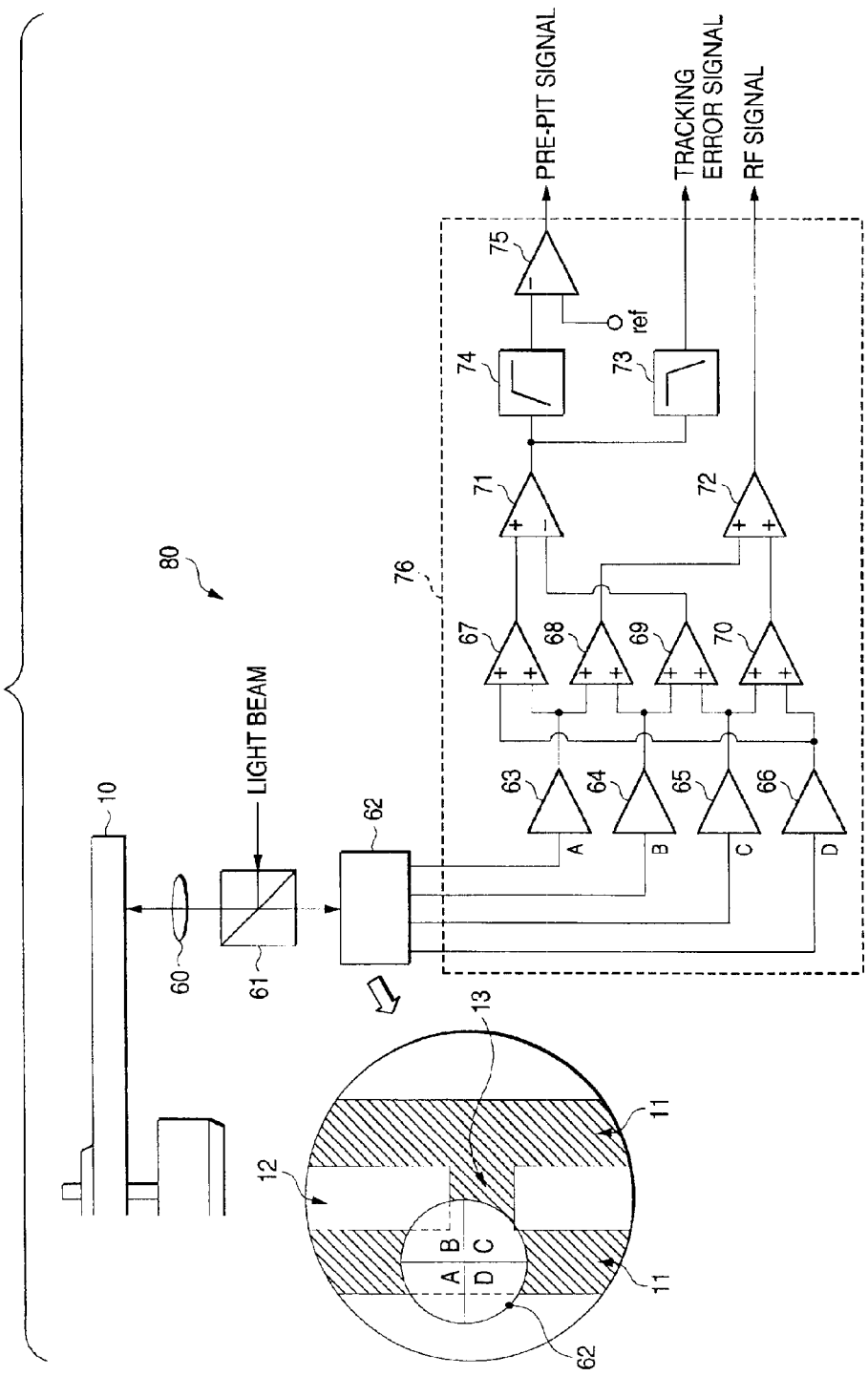
FIG. 5 is a main block diagram of a recording and reproducing apparatus.

FIG. 5 is a main block diagram of a recording and reproducing apparatus 80. A configuration and operation of the recording and reproducing apparatus 80 will be described with reference to FIG. 5.

The recording and reproducing apparatus 80 comprises a beam splitter 61 for reflecting a laser beam to guide the laser beam to an objective lens 60 and also transmitting a light beam reflected by a record information surface of the DVD-RW 10 to guide the light beam to a photodetector 62, an objective lens 60 for gathering the light beam reflected by the beam splitter 61 to focus on the record information surface of the DVD-RW 10, a radial push-pull type photo-detector 62 for detecting the light quantity of the light beam reflected by the record information surface of the DVD-RW 10 with four light receiving elements A to D, and a computation processing part 76 for computing and processing a light-to-current conversion signal outputted from the photodetector 62.

The drawing within a circle in FIG. 5 schematically shows a situation in which the reflected light of the light beam applied on the groove tracks 11 and the pre-pits 13 is detected by the photodetector 62, and the photodetector 62 is placed on a centerline of the groove tracks 11 and detects the reflected light on the groove tracks 11 by the four light receiving elements A to D. The recording and reproducing apparatus 80 is constructed so as to obtain a tracking error signal, an RF signal and a pre-pit signal described below by computing and processing the light-to-current conversion signal outputted from the four light receiving elements A to D of this photodetector 62 by the computation processing part 76.

The computation processing part 76 comprises four current/voltage converters 63 to 66, five adders 67 to 70 and 72, a subtracter 71, a low-pass filter (LPF) 73, a high-pass filter (HPF) 74, and a comparator 75. Each of output signals A to D of the photodetector 62 is supplied to the four current/voltage converters 63 to 66 and is converted from a current value to a voltage value by each of the current/voltage converters 63 to 66. Output signals of the current/voltage converter 63 and the current/voltage converter 66 are added by the adder 67. Also, output signals of the current/voltage converter 64 and the current/voltage converter 65 are added by the adder 69. Then, output signals of the adder 67 and the adder 69 are subtracted by the subtracter 71 and are outputted from the subtracter 71 as a radial push-pull signal in a form of (A+D)−(B+C). In this radial push-pull signal, a pre-pit signal component is removed by the LPF 73 and an output is produced as a tracking error signal. Also, in the radial push-pull signal outputted from the subtracter 71, a tracking error signal component is removed by the HPF 74 and further a comparison with a predetermined reference level is performed by the comparator 75 and whereby an output is produced as a pre-pit detection signal.

On the other hand, output signals of the current/voltage converter 63 and the current/voltage converter 64 are added by the adder 68. Also, output signals of the current/voltage converter 65 and the current/voltage converter 66 are added by the adder 70. Then, output signals of the adder 68 and the adder 70 are added by the adder 72 and are outputted from the adder 72 as an RF signal in a form of (A+B)+(C+D).

In the recording and reproducing apparatus 80, when record information is recorded on the DVD-RW 10, rotation control of the DVD-RW 10 is performed at a predetermined rotational speed by extracting a wobbling frequency of the groove tracks 11 and also pre-information is acquired in advance by detecting the pre-pits 13 and based on that information, the optimum output of a light beam acting as record light is set. Also, in the recording and reproducing apparatus 80, address information indicating a position on the DVD-RW 10 to be recorded record information is acquired by detecting the pre-pits 13 and based on this address information, the record information is recorded in a desired position.

The recording and reproducing apparatus 80 applies a light beam corresponding to the record information to the groove tracks 11 and forms information pits on the groove tracks 11. At this time, as shown in FIG. 4, a size of a light spot (SP) is set so that the light spot is applied to not only the groove tracks 11 but also the pre-pits 13 formed on the land tracks 12. Therefore, the recording and reproducing apparatus 80 can detect the pre-pits 13 to acquire the pre-information based on the radial push-pull signal generated by detecting the reflected light of the light spot (SP).

Figure 6:
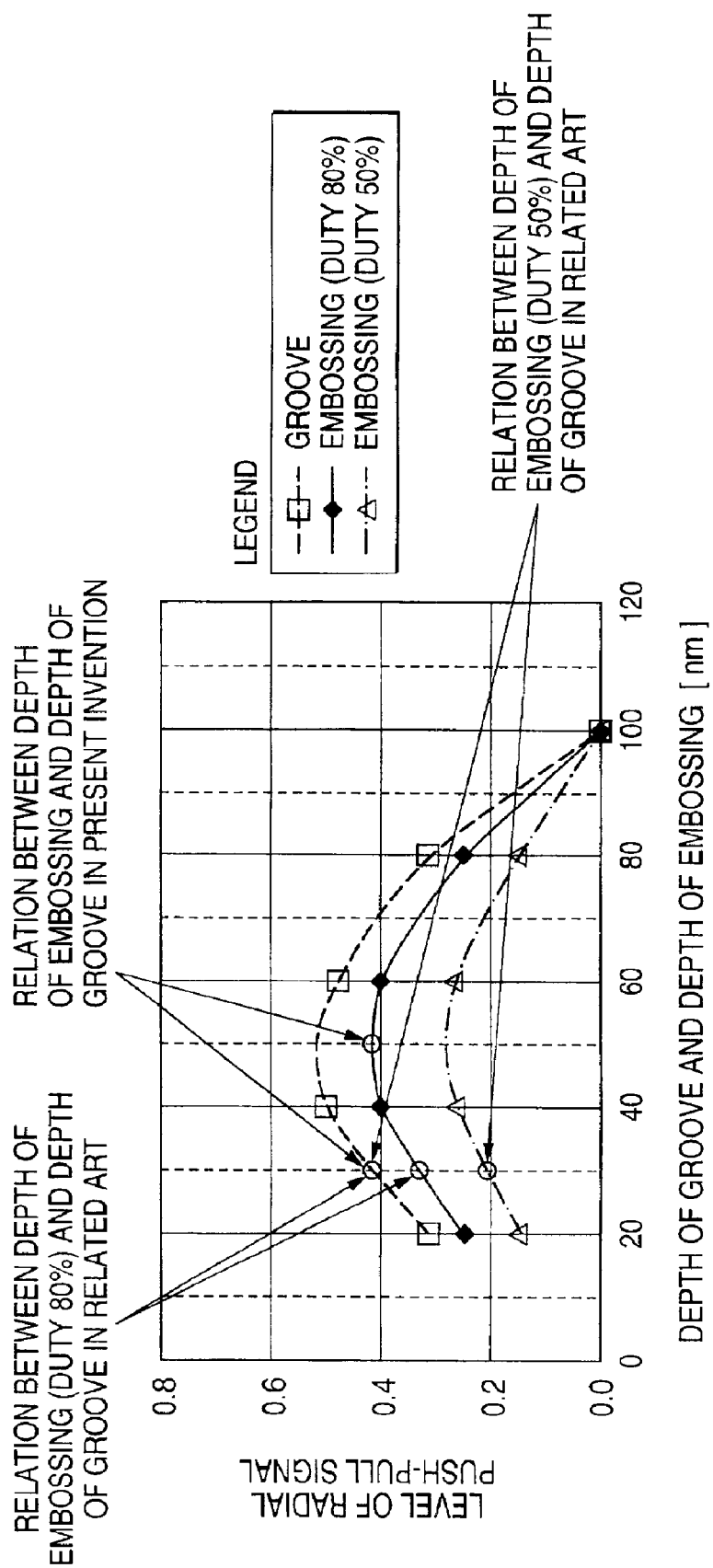
FIG. 6 is a graph in which a relation of a radial push-pull signal level to a depth Gd of groove tracks and a depth Ed of embossed pit rows.

FIG. 6 is a graph in which a relation of a radial push-pull signal level to a depth Gd of groove and a depth Ed of embossing formed in the DVD-RW 10 is obtained by simulation, and an axis of abscissa shows the depth Gd of the groove and the depth Ed of the embossing and an axis of ordinate shows a radial push-pull signal. A curve shown by a dotted line in FIG. 6 shows a relation of a radial push-pull signal level Vg to the depth Gd of the groove tracks 11 and a curve shown by a solid line shows a relation of the radial push-pull signal level Ve to the depth Ed of the embossed pit rows 19 having 80% in the average Duty ratio. A curve shown by a chain line in FIG. 6 shows a relation of a radial push-pull signal level Ve to the depth Ed of the embossed pit rows 19 having 50% in the average Duty ratio.

As described above, according to the DVD-RW shown in FIG. 13, both of the depth Gd of the groove tracks 1 and the depth Ed of the embossed pit rows 4 are formed at about 30 nm, so that a radial push-pull signal level in the groove tracks 1 is about 0.42 and a radial push-pull signal level in the embossed pit rows 4 is about 0.32 as shown in FIG. 6. That is, the radial push-pull signal level in the embossed pit rows 4 decreases to about 76% with respect to the radial push-pull signal level in the groove tracks 1.

When both the depth of the groove tracks 1 and the depth of the embossed pit rows 4 are formed in 30 nm and the average Duty ratio of the embossed pit rows is formed in 50%, the radial push-pull signal level Vg in the groove tracks 1 is about 0.42 and the radial push-pull signal level Ve in the embossed pit rows 4 is about 0.2. That is, the radial push-pull signal level Ve in the embossed pit rows 4 is reduced about 48% of the radial push-pull signal level Vg in the groove tracks 1.

On the other hand, according to the DVD-RW 10 of the embodiment, a depth Gd of the groove tracks 11 is formed at about 30 nm and a depth Ed of the embossed pit rows 19 is formed at about 50 nm. Therefore, as shown in FIG. 6, the radial push-pull signal level in the embossed pit rows 19 increases to about 0.42 to be substantially equal to a radial push-pull signal level in the groove tracks 11.

As described above, in the case of forming the groove tracks 11 at the depth Gd of about 30 nm, the radial push-pull signal level Vg in the groove tracks can be set substantially equal to the radial push-pull signal level Ve in the embossed pit rows when the embossed pit rows 19 having the average duty of 80% are formed at the depth Ed of about 50 nm. However, the invention is not limited to these numeric values of the depth Gd of the groove tracks, the average duty, and the depth Ed of the embossed pit rows. In order to be the radial push-pull signal level Ve in the embossed pit rows not smaller than about 80% of the radial push-pull signal level Vg in the groove tracks , relation among the depth Gd of the groove tracks, the average duty, and the depth Ed of the embossed pit rows will be described below with reference to FIGS. 7 to 9.

Figure 7:
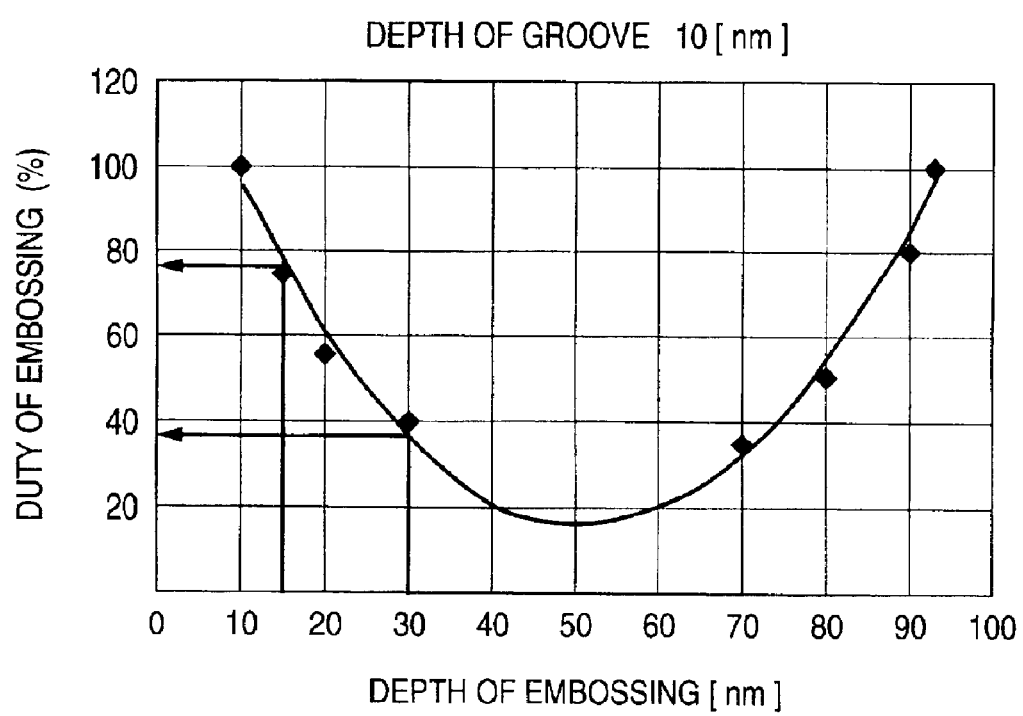
FIG. 7 is a graph showing a relation between a depth Ed and an average duty ratio of the embossed pit rows for obtaining the same radial push-pull signal level in case that the depth Gd of the groove tracks is set at 10 nm.
Figure 8:
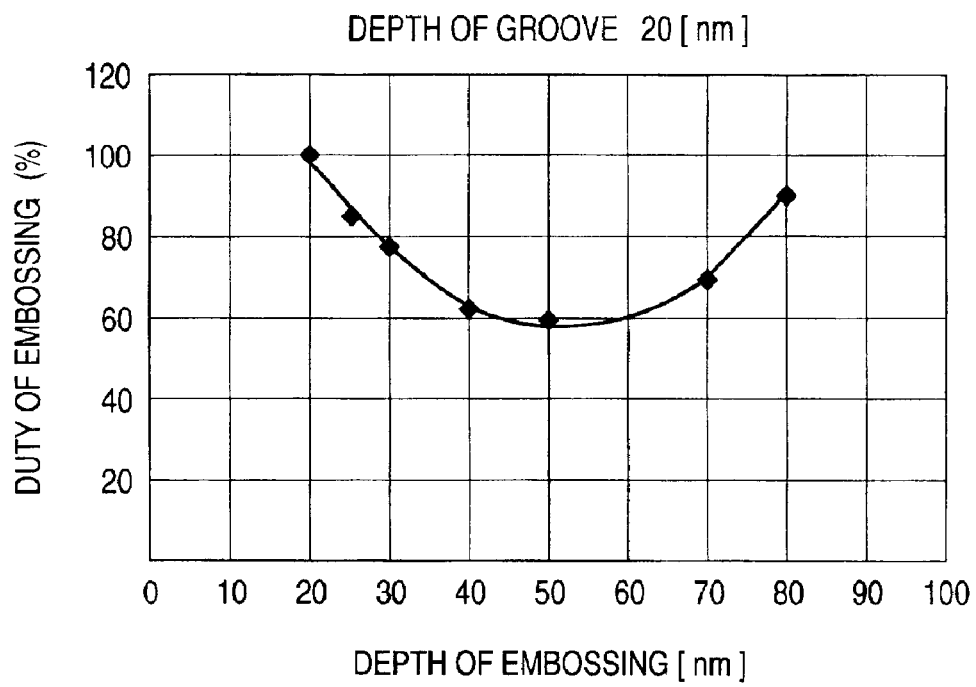
FIG. 8 is a graph showing a relation between a depth Ed and the average duty ratio of the embossed pit rows for obtaining the same radial push-pull signal level in case that the depth Gd of the groove tracks is set at 20 nm.
Figure 9:
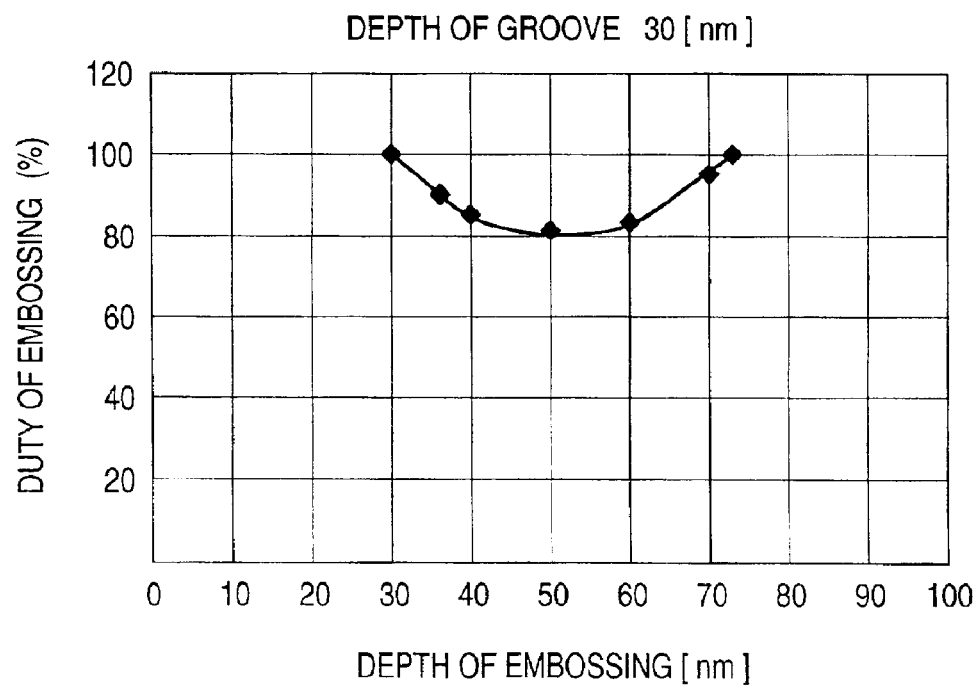
FIG. 9 is a graph showing a relation between a depth Ed and the average duty ratio of the embossed pit rows for obtaining the same radial push-pull signal level in case that the depth Gd of the groove tracks is set at 30 nm.

In FIGS. 7 to 9, when a depth Gd of the groove tracks is fixed at a predetermined depth, a relation between a depth Ed and the average duty ratio of the embossed pit rows for obtaining the radial push-pull signal level in the embossed pit rows equal to the radial push-pull signal level in the groove tracks is obtained by simulation and this is formed in a graph, and an axis of abscissa shows the depth Ed [nm] of the embossed pit rows and an axis of ordinate shows the average duty ratio [%] of the embossed pit rows.

FIG. 7 is an example of a case that the depth Gd of the groove tracks is set at 10 nm. In FIG. 7, for example, in case of setting the depth Ed of the embossed pit rows at 15 nm, the radial push-pull signal level in the groove tracks is equal to the radial push-pull signal level in the embossed pit rows when the average duty ratio of the embossed pit rows is 76%. Also, in case of setting the depth Ed of the embossed pit rows at 30 nm, both of the radial push-pull signal levels are equal when the average duty ratio is 36%. FIG. 7 is a graph obtained thus, and a quadratic curve in which the average duty ratio becomes the minimum when the depth Ed of the embossed pit rows is about 50 nm (exactly, 51.4 nm) is obtained. The quadratic curve obtained here can be approximated by the following mathematical equation 1.

$$\text{Duty}=0.0461Ed^2-4.720Ed+136.13 \quad \text{[Eq. 1]}$$

FIG. 8 is an example of a case that the depth Gd of the groove tracks is set at 20 nm. FIG. 8 is a graph in which results simulated by the same procedure as that described with reference to FIG. 7 are plotted. In the graph of FIG. 8, the average duty ratio of the embossed pit rows is large as a whole in comparison with the example shown in FIG. 7, and a quadratic curve in which the average duty ratio of the embossed pit rows is minimized when the depth Ed of the embossed pit rows is about 50 nm is obtained. The quadratic curve obtained here can be approximated by the following mathematical equation 2.

$$\text{Duty}=0.0401Ed^2-4.149Ed+164.9 \quad \text{[Eq. 2]}$$

Similarly, FIG. 9 is an example of a case that the depth Gd of the groove tracks is set at 30 nm. The average duty ratio of the embossed pit rows is more larger in comparison with the example shown in FIG. 8, and a quadratic curve in which the average duty ratio of the embossed pit rows is minimized when the depth Ed of the embossed pit rows is about 50 nm is obtained. The quadratic curve obtained here can be approximated by the following mathematical equation 3.

$$\text{Duty}=0.0423Ed^2-4.353Ed+192.7 \quad \text{[Eq. 3]}$$

Figure 10:
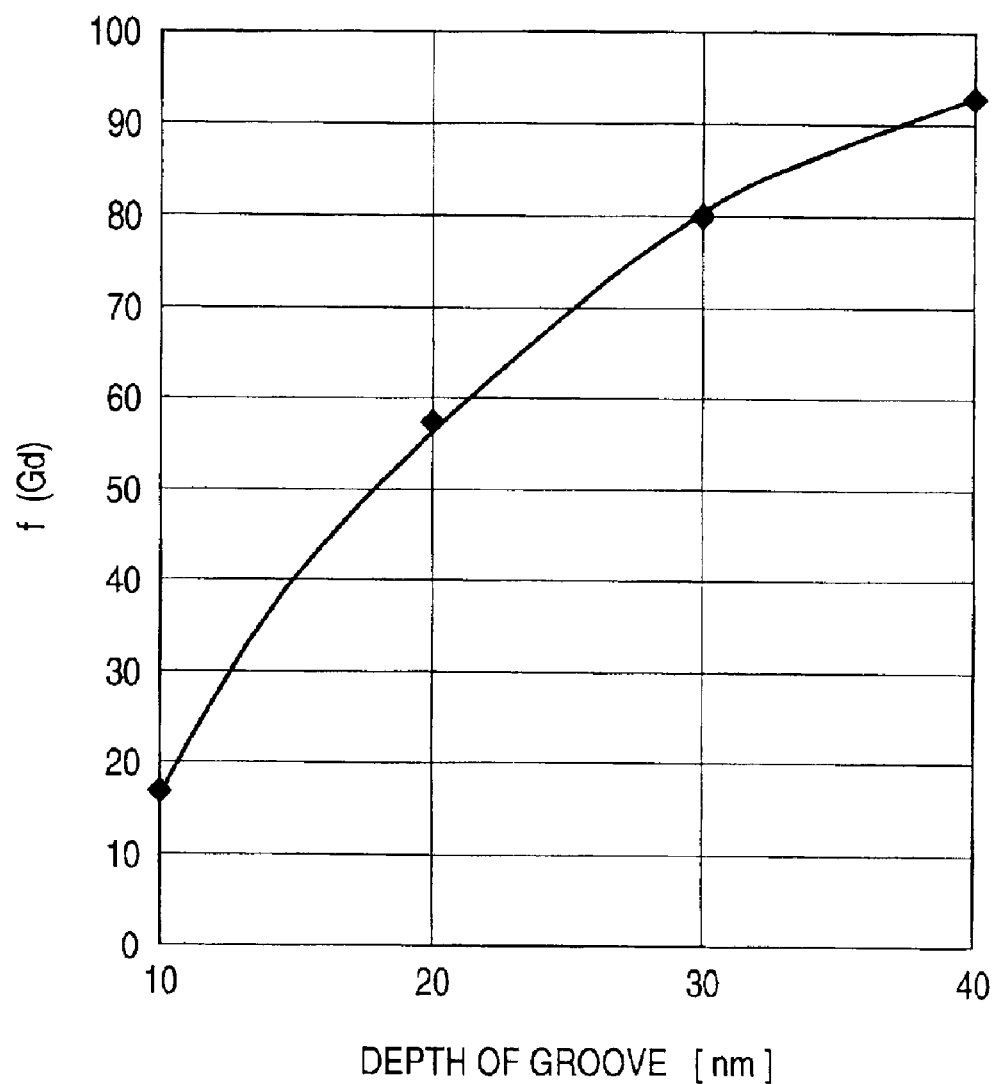
FIG. 10 is a graph showing a relation between a depth Gd of the groove tracks and each of minimum values f (Gd) in which the average duty ratio of the embossed pit rows shown in FIGS. 7 to 9 becomes a minimum.

In FIG. 10, the minimum values f (Gd) of the average duty ratio of the embossed pit rows shown in FIGS. 7 to 9 are plotted. An axis of abscissa shows the depth Gd of the groove tracks and an axis of ordinate shows the minimum value f(Gd). A quadratic curve obtained here can be approximated by the following mathematical equation 4.

$$f(Gd) = -0.07Gd^2 + 6Gd - 35.6 \quad [\text{Eq. 4}]$$

Based on the mathematical equations 7 to 10, the average duty of the embossed pit rows in case of selecting the depth Gd of the groove tracks and the depth Ed of the embossed pit rows can be approximated by the following mathematical equation 5.

$$\text{Duty} = 0.04(Ed - \lambda/8n)^2 + f(Gd) \quad [\text{Eq. 5}]$$

Here, λ denotes a wavelength [nm] of a light beam and n denotes a refractive index of a substrate of the DVD-RW 10 and f(Gd) is the minimum value of the average duty ratio of the embossed pit rows and for example, the minimum value is about 51.4 nm when a wavelength (λ) of a light beam is 650 nm and a refractive index (n) of a substrate is 1.58, and the minimum value f(Gd) becomes an intrinsic value determined by the depth Gd of the groove tracks.

For example, when the depth Gd of the groove tracks is 30 nm and the depth Ed of the embossed pit rows is 50 nm and λ/8n is 51.4 nm, f (Gd)=81.4 nm is obtained by the mathematical equation 4 and the average Duty=81.4784 is obtained by the mathematical equation 5. As described in FIG. 6, this result corresponds to a result that in the case of forming the depth Gd of the groove tracks at 30 nm, the radial push-pull signal level on the groove tracks 11 is substantially equal to the radial push-pull signal level on the embossed pit rows when the embossed pit rows with the average duty ratio of about 80% are formed at a depth of 50 nm.

According to the DVD-RW 10 of the embodiment thus, when numeric values satisfying the mathematical equations 4 and 5 are set in a relation among the depth Gd of the groove tracks, the depth Ed, and the average duty of the embossed pit rows, the radial push-pull signal level Ve on the embossed pit rows 19 can be set not to be smaller than about 80% of the radial push-pull signal level Ve on the groove tracks 11 certainly.

Next, an optical recording medium manufacturing apparatus 50 for cutting an optical disk master 40 necessary to manufacture the DVD-RW 10 of the embodiment will be described with reference to a block diagram shown in FIG. 11.

The optical recording medium manufacturing apparatus 50 comprises a land data generator 20, a parallel/serial converter (P/S) 21, an encoder 22 for pre-format, a clock signal generator 23, a light beam generation device 24, an objective lens 25, a spindle motor 26, a rotation detector 27, a rotation servo circuit 28, a feeding unit 29, a position detector 30, a feeding servo circuit 31, a controller 32, a groove data generator 33, a wobbling signal generator 34, and a switch 35.

The optical disk master 40 mounted on the spindle motor 26 is formed of a glass substrate 41 and a resist layer 42 coated on this glass substrate 41. The resist layer 42 is exposed by applying a light beam B described below, and pits having a shape corresponding to a change in intensity of the light beam B are formed.

Figure 11:
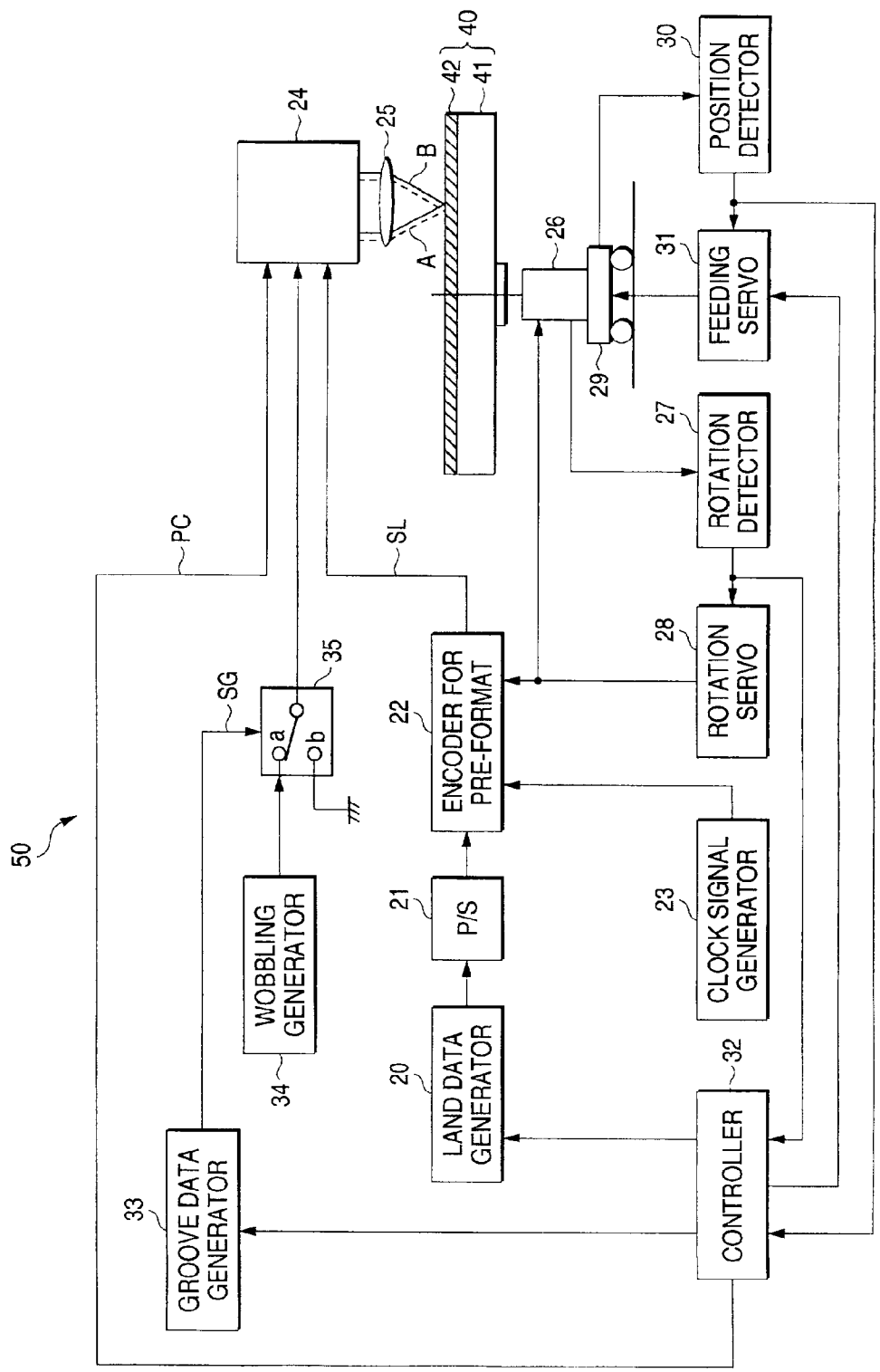
FIG. 11 is a schematic configuration diagram of an optical recording medium manufacturing apparatus according to the invention.

In FIG. 11, the land data generator 20 outputs parallel data corresponding to the pre-pits 13 formed on the land tracks 12 under control of the controller 32. The outputted parallel data is converted into serial data by the parallel/serial converter 21. Then, this serial data is inputted to the encoder 22 for pre-format to output a pre-pit formation signal SL for actually forming the pre-pits 13 on the optical disk master 40 to the light beam generation device 24 on a basis of a clock signal supplied from the clock signal generator 23.

On the other hand, the groove data generator 33 generates a groove formation signal SG including record data formed as the groove tracks 11 and the embossed pit rows 19 under control of the controller 32 to output the signal as a control signal to the switch 35. That is, the switch 35 is turned on or off by the output signal of the groove data generator 33.

The wobbling signal generator 34 generates a wobbling signal for providing a slight wave to the groove tracks 11 to output the signal to the switch 35. In the switch 35, switching control is performed on a basis of the groove data outputted from the groove data generator 33. When the switching has been done to a side of a terminal a, the wobbling signal outputted from the wobbling signal generator 34 is outputted to the light beam generation device 24. When the switching has been done to a side of a terminal b, an output to the light beam generation device 24 is formed into a ground level.

The light beam generation device 24 emits two light beams A (shown by a dotted line in the drawing) and B (shown by a solid line in the drawing) for forming the groove tracks 11 and the pre-pits 13 with respect to the optical disk master 40, respectively. The light beam generation device 24 is a device for emitting the light beam A for forming the groove tracks 11 based on the output of the switch 35 described above, and when the switch 35 has been shifted to the side of the terminal a, the first light beam A is deviated in a radial direction of a disk in response to a change in a level of the wobbling signal outputted from the wobbling signal generator 34 and the groove track portion meandering on the resist layer 42 is exposed. Also, when the switch 35 is shifted to the side of the terminal b so that a signal from the switch 35 is a ground level, the light beam generation device 24 stops the emission of the light beam A and stops the exposure of the resist layer 42. Thus, the embossed pit portion can be exposed on the resist layer 42 by switching the switch 35. Further, in the light beam generation device 24, the laser power is controlled on a basis of a control signal PC of the controller 32 and when the embossed pit portion is exposed, the laser power of the light beam A is increased and the resist layer 42 is exposed deeper than the groove track portion.

Also, on a basis of the pre-pit formation signal SL outputted from the encoder 22 for pre-format, the light beam generation device 24 turns on or off the second light beam B to expose the pre-pit portion between the adjacent groove track portions.

On the other hand, the spindle motor 26 rotates the optical disk master 40 and also the rotation detector 27 detects rotation of the optical disk master 40. As a result of this, the rotation servo circuit 28 controls rotation of the optical disk master 40 and also rotation pulses in synchronization with the rotation are outputted. The position detector 30 detects a position of the feeding unit 29 and outputs a detected signal to the feeding servo circuit 31. The feeding servo circuit 31 acquires position information of the feeding unit 29 based on the detected signal from the position detector 30 and whereby servo control of movement of the feeding unit 29 is performed.

Next, cutting processing of the optical disk master 40 performed in the optical recording medium manufacturing apparatus 50 according to the embodiment will be described with reference to a flowchart shown in FIG. 12. Incidentally, this processing is performed by the controller 32 mainly according to a control program recorded in memory (not shown). Also, such a control program will be described by an example in which the groove track portion corresponding to the groove tracks 11 with respect to the optical disk master 40 is exposed at a depth of 30 nm and the embossed pit portion corresponding to the embossed pit rows 19 is exposed at a depth of 50 nm.

Figure 12:
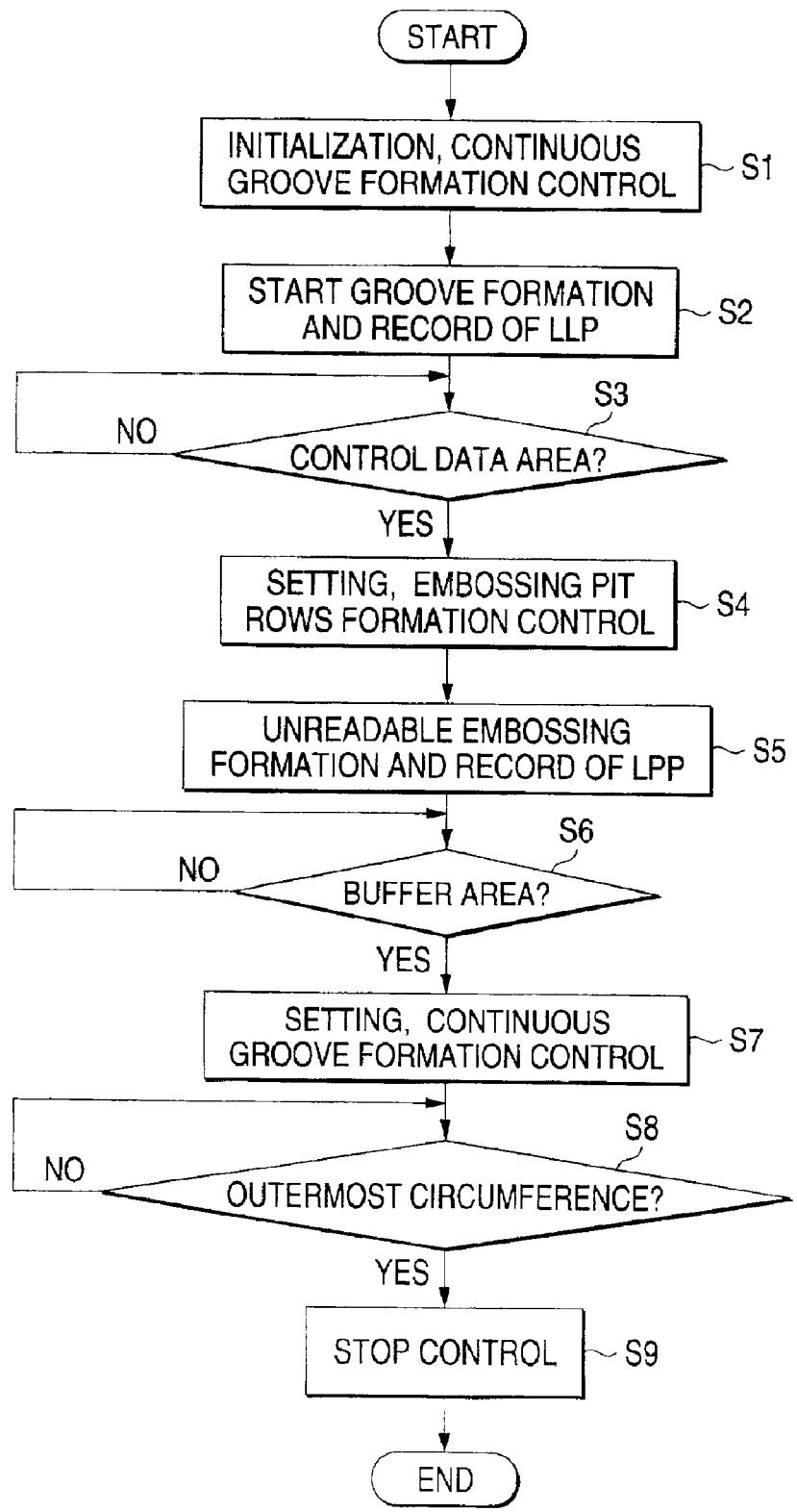
FIG. 12 is an operational flowchart of the optical recording medium manufacturing apparatus.

As shown in FIG. 12, when the cutting processing in the optical recording medium manufacturing apparatus 50 is started, the switch 35 is shifted to the side of the terminal a in order to expose the continuous groove track portions and also the land data generator 20 is initialized in order to expose the pre-pit portion corresponding to the pre-pits 13. Also, the laser power of the light beam generation device 24 is set so that a depth Gd of the groove becomes 30 nm (step S1).

Subsequently, exposure of the groove track portion and the pre-pit portion with respect to the optical disk master 40 is started (step S2). That is, while controlling the rotation servo circuit 28 and the feeding servo circuit 31, the light beam generation device 24 is driven and controlled to start exposure of the optical disk master 40 by the first light beam A and the second light beam B. Then, address information to be recorded in the pre-pit portion is referred and it is determined whether or not the first light beam A reaches a control data zone (step S3). Incidentally, this determination may detect whether or not the address information becomes the head address 02F200h of the control data zone as shown in FIG. 2. Then, as a result of the determination in step S3, if the first light beam A reaches the control data zone (step S3: YES), an operation proceeds to step S4.

In order to expose the embossed pit portion, the groove data generator 33 is controlled to output control data of the average duty of 80%, and also in order to set the exposure depth at 50 nm, the laser power of the light beam generation device 24 is set high (step S4), and exposure of the embossed pit portion and the pre-pit portion with respect to the optical disk master 40 is started (step S5). Subsequently, address information to be recorded in the pre-pit portion is referred and it is determined whether or not the first light beam A reaches a buffer zone 2 (step S6). Incidentally, this determination may detect whether or not the address information becomes the head address 02FE00h of the buffer zone as shown in FIG. 2. Then, as a result of the determination in step S6, if the first light beam A reaches the buffer zone (step S6: YES), an operation proceeds to step S7.

After the buffer zone 2, the continuous groove track portions and the pre-pit portions must again be exposed at a depth of 30 nm, so that the groove data generator 33 is controlled to shift the switch 35 to the side of the terminal a, and the laser power of the light beam generation device 24 is returned to an initial value, and exposure of the groove track portion and the pre-pit portion with respect to the optical disk master 40 is performed (step S7). Then, address information to be recorded in the pre-pit portion is referred and it is determined whether or not the first light beam A reaches the outermost circumference of the optical disk master 40 (step S8). As a result of this determination, if it is detected that the first light beam A reaches the outermost circumference (step S8: YES), an operation proceeds to step S9 and stop control is performed to complete a series of operation programs.

By performing the operation control described above, the groove track portion, the embossed pit portion and the pre-pit portion corresponding to the spiral groove tracks 11, embossed pit rows 19 and pre-pits 13 are exposed on the optical disk master 40. Thereafter, this optical disk master 40 is subjected to developing treatment and the exposed portion is removed. Then, based on the optical disk master 40 after this development, a stamper is formed and thereafter using this stamper, the DVD-RW 10 in accordance with the embodiment is mass-manufactured according to a well known replication process.

Incidentally, the invention is not limited to the embodiment described above. For example, according to the embodiment described above, the example in which the invention is applied to the DVD-RW disk is shown, but it goes without saying that the invention maybe applied to an optical recording medium of other types such as DVD-R or DVD-RAM. Also, the depth Gd of the groove tracks 11 is 50 nm and the depth Ed of the embossed pit rows 19 is 80 nm and the average duty is 80%, but their values can take on various values based on the mathematical equations 4 and 5 described above.

According to the invention, a constant radial push-pull signal can be obtained over the whole region of a disk and an operation of a servo circuit in a recording and reproducing apparatus can always be maintained stably.

What is claimed is:

1. An optical recording medium capable of optically recording record information, comprising:

a first region formed with continuous groove tracks thereon to record the record information; and a second region formed with discontinuous embossed pit rows thereon in accordance with predetermined data, wherein the embossed pit rows prevent reproducing data overwritten on the second region, a level of a radial push-pull signal of the second region is not smaller than 80% of a level of a radial push-pull signal of the first region, and wherein the groove tracks and the embossed pit rows substantially satisfy the following mathematical equation $$\text{Duty}=0.04(Ed-\lambda/8n)^2+(-0.07Gd^2+6Gd-35.6)$$

where Duty [%] is an average duty of the embossed pit rows, Ed [nm] is a depth of the embossed pit rows, $\lambda$ [nm] is a wavelength of a light beam, and n is a refractive index of a substrate of the optical recording medium, and Gd [nm] is a depth of the groove track.

2. An optical disk master manufacturing apparatus for manufacturing an optical disk master for manufacturing an optical recording medium capable of optically recording record information, the optical recording medium comprising a first region formed with continuous groove tracks thereon to record the record information and a second region formed with discontinuous embossed pit rows thereon in accordance with predetermined data, wherein the embossed pit rows prevent reproducing data overwritten on the second region, and a level of a radial push-pull signal of the second region is not smaller than 80% of a level of a radial push-pull signal of the first region, wherein the groove tracks and the embossed pit rows of the optical recording medium substantially satisfy the following mathematical equation $$\text{Duty}=0.04(Ed-\lambda/8n)^2+(-0.07Gd^2+6Gd-35.6)$$

where Duty [%] is an average duty of the embossed pit rows, Ed [nm] is a depth of the embossed pit rows, $\lambda$[nm] is a wavelength of a light beam, and n is a refractive index of a substrate of the optical recording medium, and Gd [nm] is a depth of the groove track, the apparatus comprising:

a light beam generator for forming a plurality of regions on the optical disk master corresponding to the first and second regions of the optical recording medium; and a controller for controlling the light beam generator.

3. An optical disk master manufacturing method for manufacturing an optical disk master for manufacturing an optical recording medium capable of optically recording record information, the optical recording medium comprising a first region formed with continuous groove tracks thereon to record the record information and and a second region formed with discontinuous embossed pit rows thereon in accordance with predetermined data, wherein the embossed pit rows prevent reproducing data overwritten on the second region, and a level of a radial push-pull signal of the second region is not smaller than 80% of a level of a radial push-pull signal of the first region, wherein the groove tracks and the embossed pit rows of the optical recording medium substantially satisfy the following mathematical equation $$\text{Duty}=0.04(Ed-\lambda/8n)^2+(-0.07Gd^2+6Gd-35.6)$$

where Duty [%] is an average duty of the embossed pit rows, Ed [nm] is a depth of the embossed pit rows, $\lambda$[nm] is a wavelength of a light beam, and n is a refractive index of a substrate of the optical recording medium, and Gd [nm] is a depth of the groove track, the method comprising the steps of forming a plurality of regions on the optical disk master corresponding to the first and second regions of the optical recording medium.

* * * * *